O. G. SAXTON.
DEVICE FOR DISLODGING INSECTS FROM VINES.
APPLICATION FILED DEC. 5, 1910.
1,012,450.
Patented Dec. 19, 1911.
2 SHEETS—SHEET 1.
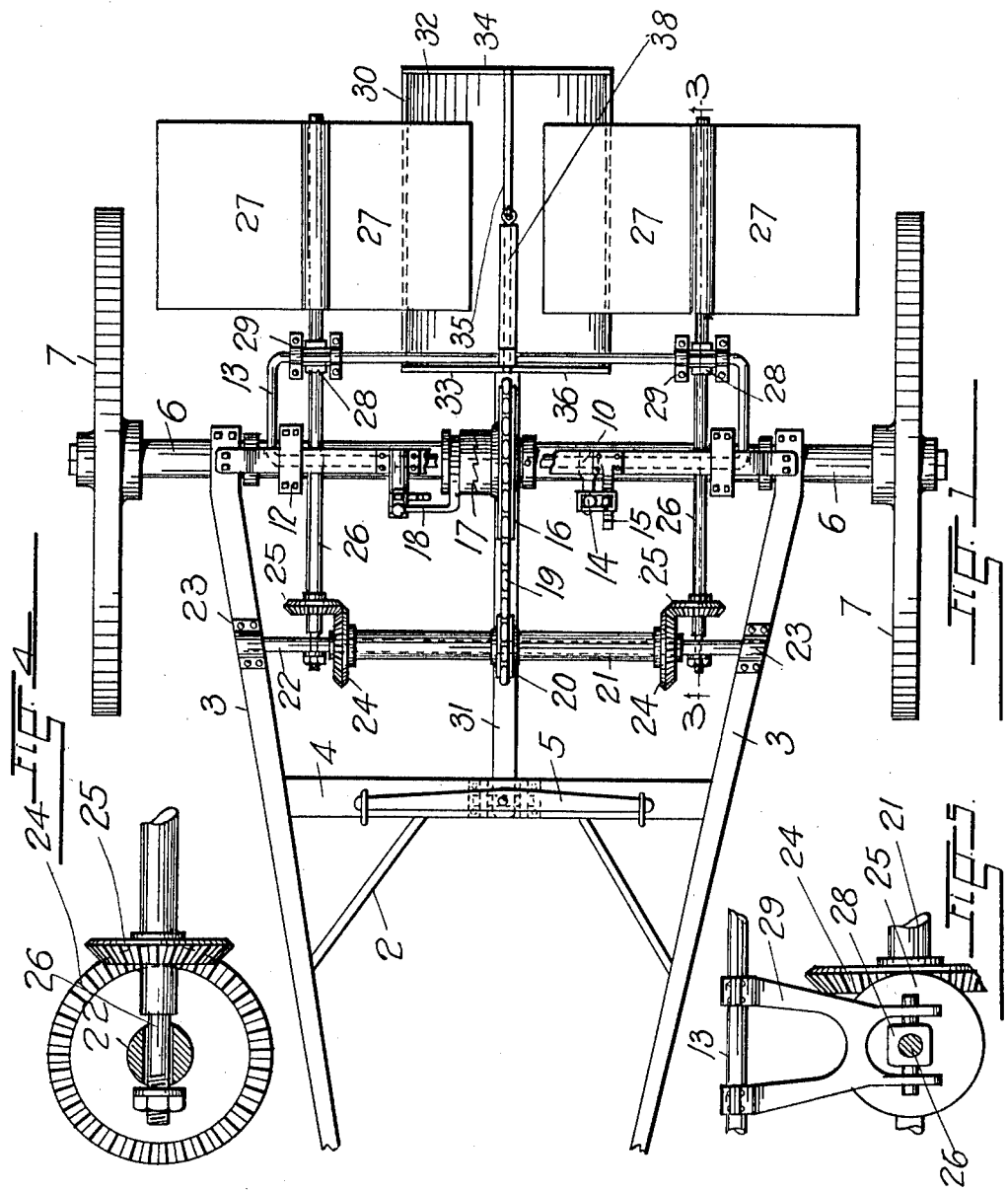
WITNESSES:
INVENTOR.
O. G. Saxton
BY
ATTORNEY.

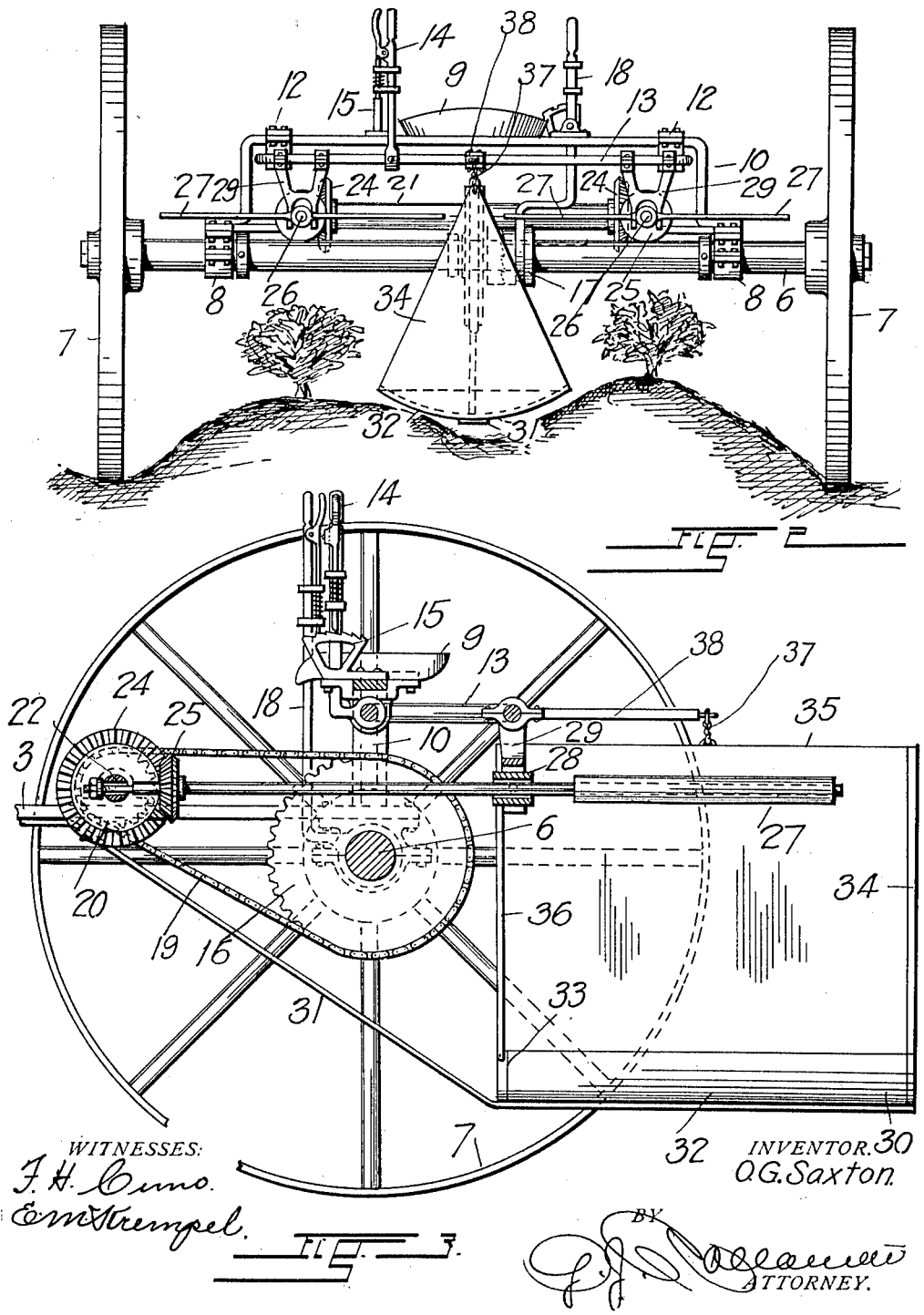

UNITED STATES PATENT OFFICE.

OLIVER G. SAXTON, OF LUCERNE, COLORADO, ASSIGNOR OF ONE-FOURTH TO DANIEL R. KINNEY, OF GREELEY, COLORADO.

DEVICE FOR DISLODGING INSECTS FROM VINES.

1,012,450.      Specification of Letters Patent.      Patented Dec. 19, 1911.

Application filed December 5, 1910. Serial No. 595,663.

*To all whom it may concern:*

Be it known that I, OLIVER G. SAXTON, a citizen of the United States of America, residing at Lucerne, in the county of Weld and State of Colorado, have invented certain new and useful Improvements in Devices for Dislodging Insects from Vines, of which the following is a specification.

My invention relates to a machine for dislodging insects from plants and more particularly to a machine designed to remove from potato-vines, bugs and beetles which feed on the leaves thereof, and which, in quantities, are very destructive.

The object of my invention is to provide a mechanism of simple construction which, when propelled along the rows of vines, strikes the latter with a force sufficient to dislodge the insects without injuring the plants, the blows being directed toward a receptacle which may contain kerosene or other life destroying fluid.

An embodiment of my invention is illustrated in the accompanying drawings in the various views of which like parts are similarly designated and in which—

Figure 1 represents a plan view of the machine, Fig. 2, a rear elevation of the same, Fig. 3, a section taken along the line 3—3, Fig. 1, drawn to an enlarged scale, and Figs. 4 and 5, enlarged sectional views of the means provided to support the paddle shafts included in the construction.

Referring to the drawings by numerical reference characters, 2 designates the frame of a horse-propelled vehicle which is composed of the thills 3 and a transverse bar 4, which supports the swingle-tree 5. The wheel axle 6 upon the extremities of which, the wheels 7 are rigidly attached, is revolubly supported in bearing boxes 8 which are secured below the ends of the thills 3.

The driver's seat 9 is supported upon an arch 10, the ends of which are rigidly secured upon the rearmost ends of the thills and which by means of boxes 12, carries a rearwardly projecting, rectangular tilting frame 13, which in the operation of the apparatus, serves to adjustably support the element or elements which are designed to strike the plants along which the vehicle is propelled. A lever 14 extending upwardly from the foremost side of the tilting frame, in conjunction with a toothed segment 15 secured upon the arch, is provided to adjust the position of the frame.

A sprocket wheel 16 loosely mounted upon the axle 6, is constructed to be connected therewith by means of a clutch 17 which is operated by manipulation of a lever 18 extending in adjacency to the driver's seat 9, and the said wheel is, by means of a chain 19, connected with a corresponding wheel 20 of smaller diameter which is carried upon a sleeve 21, which has a rotary movement about a shaft 22, revolubly mounted in boxes 23 on the thills 3. The sleeve 21 carries upon its extremities, bevel gear-wheels 24, which mesh respectively with similar gear wheels 25, secured upon parallel shafts 26 which extend at right angles to the axle 6 and approximately at equal distances from the longitudinal axis of the vehicle, and which at their rearmost portions carry the laterally extending paddles or blades 27 which in the operation of the machine, strike the vines along which it is propelled. The shafts 26 are supported at one of their ends in transverse bores of the shaft 22 (see Fig. 4), and near their opposite extremities in trunnioned boxes 28, which are pivotally suspended in the bifurcated lower extremities of hangers 29, which are secured at the rearmost side of the tilting frame 13, as shown best in Fig. 5 of the drawings.

By the above described construction, the elevation of the paddles may be varied in accordance with the height of the vines to be engaged thereby, without changing the relative position of the gear wheels 24 and 25.

In the operation of my invention the vehicle is, by means of a horse hitched between the thills 3, propelled along the rows of potato vines, as is shown in Fig. 2, its forward movement being, by means of the hereinbefore described gearing, converted into a comparatively rapid rotatory motion of the shafts 26 in opposite directions. The paddles, which are preferably composed of leather or other flexible material, deliver to the vines a rapid succession of blows which being directed toward the longitudinal axis of the vehicle, have a force which, without injuring the plants, is sufficient to dislodge the insects which are feeding upon their leaves. The beetles which are projected into the space between the paddles on the two shafts, are collected in a pan 30, which being disposed between the said shafts, in proximity to the surface over which the vehicle is propelled, is supported upon an arm 31 which extends rearwardly from the transverse bar 4 with which it is pivotally connected. The pan 30 is composed of a transversely curved bottom plate 32 and end plates 33 and 34, the rearmost one of which tapers to the upper edge of a partition 35 which being disposed longitudinally upon the bottom 32, is supported at the forward end thereof by means of braces 36, and which, in the operation of the machine, serves to prevent the insects from being projected beyond the longitudinal edges of the pan. The pan 30, is, by means of a chain 37, suspended from an arm 38 which, projecting rearwardly from the tilting frame, not only causes the pan to move with the latter while its position is being adjusted, but which also permits the pan to be independently elevated, when not in use.

Having thus described my machine in the best form now known to me, I wish it understood that variations in the arrangement and construction of its parts may be resorted to within the spirit of the invention, what I claim and desire to secure by Letters-Patent being:—

1. In a machine of the class described, the combination with a wheeled carrier, of a rotary shaft parallel to the axis of rotation of the wheels, a sleeve rotatable on said shaft, a transverse shaft rotatable in a bore of the first named shaft and having a laterally projecting paddle, gears connecting said transverse shaft with said sleeve, means for transmitting a movement of the wheels to said sleeve, a box supporting said transverse shaft and means for varying the elevation of said box.

2. In a machine of the class described, the combination with a wheeled carrier, of a rotary shaft parallel to the axis of rotation of the wheels, a sleeve rotatable on said shaft, means for transmitting a movement of said wheels to the said sleeve, transverse shafts rotatable in bores in the first named shaft and having laterally projecting paddles, gears for converting the movement of said sleeve into movements of said transverse shafts in opposite directions, boxes supporting said transverse shafts, and means for varying the elevation of said boxes.

3. In a machine of the class described, the combination with a wheeled carrier, of an element revoluble about an axis parallel to the axis of rotation of the wheels, means for transmitting the movement of said wheels to said element, transverse shafts, connected with said element to be simultaneously actuated in opposite directions, and paddles projecting laterally from said shafts.

4. In combination, a vehicle including thills, a rotary axle and wheels fixed at opposite ends of the latter, an arch erected on said thills, a frame pivotally mounted on the said arch, gear wheels mounted to move in unison about an axis parallel to the said axle, a driving connection between the axle and the said gears, shafts on the frame rotatable about axes transverse to the axis of the said axle, gear wheels on the said shafts, respectively in mesh with the first mentioned gear wheels, whereby the said shafts are rotated in opposite directions, paddles extending laterally from the shafts, and means on the said arch for varying the angle of inclination of the said frame and a receptacle disposed between the said paddles below the plane of their axes.

In testimony whereof I affix my signature in presence of two witnesses.

OLIVER G. SAXTON.

Witnesses:
M. LAIR,
PETER WEASEL.

Copies of this patent may be obtained for five cents each, by addressing the "Commissioner of Patents, Washington, D. C."